United States Patent

Noble

[15] 3,667,370

[45] June 6, 1972

[54] NUCLEAR CONTAINMENT EMERGENCY VENTILATING SYSTEM

[72] Inventor: John H. Noble, Wellesley Hills, Mass.

[73] Assignee: Stone & Webster Engineering Corporation, Boston, Mass.

[22] Filed: Jan. 13, 1970

[21] Appl. No.: 2,531

[52] U.S. Cl. ................................................98/33 R, 176/37
[51] Int. Cl. .......................................................F24f 11/02
[58] Field of Search .....................98/33, 33 R, 38, 32, 115 R; 176/37 X

[56] References Cited

UNITED STATES PATENTS

| | | | |
|---|---|---|---|
| 843,909 | 2/1907 | Hungerford et al. | 98/33 A |
| 2,150,263 | 3/1939 | Chesney | 98/33 A X |
| 2,579,401 | 12/1951 | Schneible et al. | 98/115 |
| 3,459,635 | 8/1969 | Bevilacqua | 176/37 |
| 3,482,377 | 12/1969 | Walrave | 176/37 X |

FOREIGN PATENTS OR APPLICATIONS

| | | | |
|---|---|---|---|
| 868,672 | 5/1961 | Great Britain | 176/37 |

*Primary Examiner*—Manuel A. Antonakas
*Attorney*—Morgan, Finnegan, Durham & Pine

[57] ABSTRACT

An emergency air mixing and venting system within the containment structure of a nuclear power reactor containment system mixes gases and vapors contaminated with radioactivity with air contained in the containment structure prior to passing air in the containment through conventional gas treatment equipment and subsequently discharging it to the outside atmosphere.

16 Claims, 2 Drawing Figures

PATENTED JUN 6 1972 3,667,370

INVENTOR
John H. Noble by
Morgan, Finnegan, Durham & Pine
ATTORNEYS

NUCLEAR CONTAINMENT EMERGENCY VENTILATING SYSTEM

BACKGROUND AND OBJECTS OF THE INVENTION

1. Field of the Invention

This invention relates generally to nuclear power reactor containment systems, and relates more particularly to a new and improved emergency air mixing and venting system, having utility especially in a secondary containment structure, for mixing radioactive gases released upon the occurrence of a nuclear accident with the volume of air contained in the secondary containment structure prior to venting air from the secondary containment structure to the outside atmosphere.

2. Description of the Prior Art

Nuclear power plants employing boiling water reactors generally include both a primary containment structure, which houses the nuclear reactor and certain auxiliary equipment, and a secondary containment structure, which encloses the primary containment and also houses other auxiliary equipment. The primary containment structure is in the form of a pressure vessel, designed to withstand the maximum pressure build-up which might be obtained as a result of an accident within the reactor. The secondary containment structure is built to be maintained at a small negative pressure to contain and control any primary containment leakage.

At least two kinds of nuclear accidents can be foreseen, the occurrence of which would result in the release of gases and vapors contaminated with radioactive fission products into the secondary containment structure. In one type of accident, a failure could occur inside the primary containment of the primary coolant barrier, causing a release of primary coolant and radioactivity, and through leakage from the primary containment gases and vapors could be released into the secondary containment structure. An accident could also occur during reactor refueling, whereupon radioactivity contained within a used fuel assembly could be released inside the secondary containment structure.

Heretofore, it has been customary to provide the secondary containment structure with a ventilating system which takes fresh air into the secondary containment building from the outside atmosphere and discharges a corresponding amount back to the atmosphere. However, if an accident occurs and radioactive gases and vapors are released into the secondary containment, under present practices flow of both outlet and inlet air is immediately stopped. It is thus necessary to maintain the interior of the secondary containment structure below atmospheric pressure to prevent uncontrolled outleakage to the atmosphere of an amount of radioactivity which could exceed the limit prescribed by government regulations.

The conventional standby ventilation system for a boiling water reactor consists essentially of a fan which thereafter takes suction from the secondary containment building and discharges it to the outside atmosphere after passage through suitable gas treatment equipment which removes most of the particulate and a portion of the gaseous fission products. This fan is conventionally sized to compensate for inleakage into the secondary containment building to maintain the containment at between 0.25 and 0.5 in W.G. (water gauge) below atmospheric pressure.

The total amount of radioactivity which may be released to the atmosphere during a set period of time is rigidly controlled by government regulation. The conventional secondary containment ventilation systems, such as that described hereinabove, are disadvantageous in that it must be assumed that all gases and vapors contaminated with radioactivity go directly to the gas treatment equipment and are then immediately discharged to the outside atmosphere. As a result, it may be necessary to alter the plant design in order to compensate for the level of radioactivity discharged to the environment.

OBJECTS OF THE INVENTION

It is therefore an object of this invention to provide a new and improved emergency ventilating system.

Another object of this invention is to provide, in a nuclear power reactor containment system, a new and improved emergency ventilating system in the containment structure.

Another object of this invention is to provide, in a nuclear power reactor containment system, a new and improved emergency ventilating system which eliminates the disadvantages and shortcomings of prior secondary containment ventilating systems.

Another object of this invention is to provide, in a nuclear power reactor containment system, a new and improved emergency ventilating system which limits the concentration of radioactivity which is passed to gas treatment equipment and subsequently discharged to the outside atmosphere.

Another object of this invention is to provide, in a nuclear power reactor containment system, a new and improved emergency ventilating system which mixes and circulates gases and vapors contaminated with radioactivity discharged or accidentally released into the containment structure with substantially the entire volume of air contained in the containment structure before air contained in the containment structure is passed to gas treatment equipment and subsequently discharged to the outside atmosphere.

Another object of this invention is to provide, in a nuclear power reactor containment system, a new and improved emergency ventilating system which limits the radioactivity being discharged to the gas treatment equipment to that fraction of the activity passed through the system equal to the discharge flow divided by the total system recirculation flow by ensuring complete mixing of the total flow, or withdrawing a representative sample of the flow, or both.

Objects and advantages of the invention are set forth in part herein and in part will be obvious herefrom, or may be learned by practice of the invention, the same being realized and attained by means of the instrumentalities and combinations pointed out in the appended claims.

The invention consists in the novel parts, constructions, arrangements, combinations, improvements, steps and processes herein shown and described.

SUMMARY OF THE INVENTION

Briefly described, the method of the present invention for ventilating and maintaining at sub-atmospheric pressure a nuclear containment vessel or the like in the event of the discharge or accidental release of radioactivity into the vessel comprises: developing a forced recirculation flow within the containment structure, mixing the radioactivity with the recirculating air flow, and continuously exhausting a small fraction of the mixed, recirculating air flow, approximately equal to atmospheric inleakage, to the environment surrounding the containment vessel. Thus, the maximum rate of radioactivity release to the environment at any given time is limited to the ratio of the exhaust flow to the recirculation flow.

The nuclear containment emergency ventilating apparatus of the present invention comprises, in the preferred embodiment, a circulating fan connected on its suction side to an intake duct having a plurality of intake openings and, on its discharge side, to recirculating conduit means terminating in an annular recirculation distribution duct having a plurality of distribution openings therein. A mixing chamber is located within the recirculating conduit means and an air exhaust conduit is connected to the recirculating conduit means at a point intermediate the mixing chamber and the annular recirculation distribution duct. The air exhaust conduit leads to conventional gas treatment equipment and vents the exhaust air to the outside atmosphere.

Advantageously, and as preferably embodied, the air exhaust conduit receives air from the recirculating conduit means through a "sampling tube" device, so as to exhaust a representative sample of the recirculating air flow, and only a small fraction, preferably a maximum of about 5 percent, of the recirculating air flow is exhausted to the outside atmosphere.

Also advantageously, and as preferably embodied, the intake and distribution openings of the respective intake and recirculation distribution ducts are spaced from one another so as to develop a flow pattern encompassing at least a major portion of the free volume in the containment vessel. Thus, when the emergency ventilating system of the invention, as here preferably embodied, is placed in a secondary containment structure, the intake duct preferably extends to, and has openings at, levels of the secondary containment structure below the operating floor while the annular recirculation distribution duct is located above the operating floor and, preferably, near the top of the secondary containment structure.

It will be understood that the foregoing general description and the following detailed description as well are exemplary and explanatory of the invention but are not restrictive thereof. Thus, while the emergency ventilating system of the invention is particularly adapted to and was designed especially for use in a secondary containment structure, or other containment structure functioning in a comparable manner, for a nuclear power reactor, the principles underlying the operation of the invention are not limited to such usage. However, since the invention is particularly adaptable to such usage, reference will be made hereinafter thereto in order to provide an example of a practical and useful embodiment of the invention.

The accompanying drawings, referred to herein and constituting a part hereof, illustrate one embodiment of the invention, and together with the description, serve to explain the principles of the invention.

DESCRIPTION OF THE PREFERRED EMBODIMENT

Figure 1:
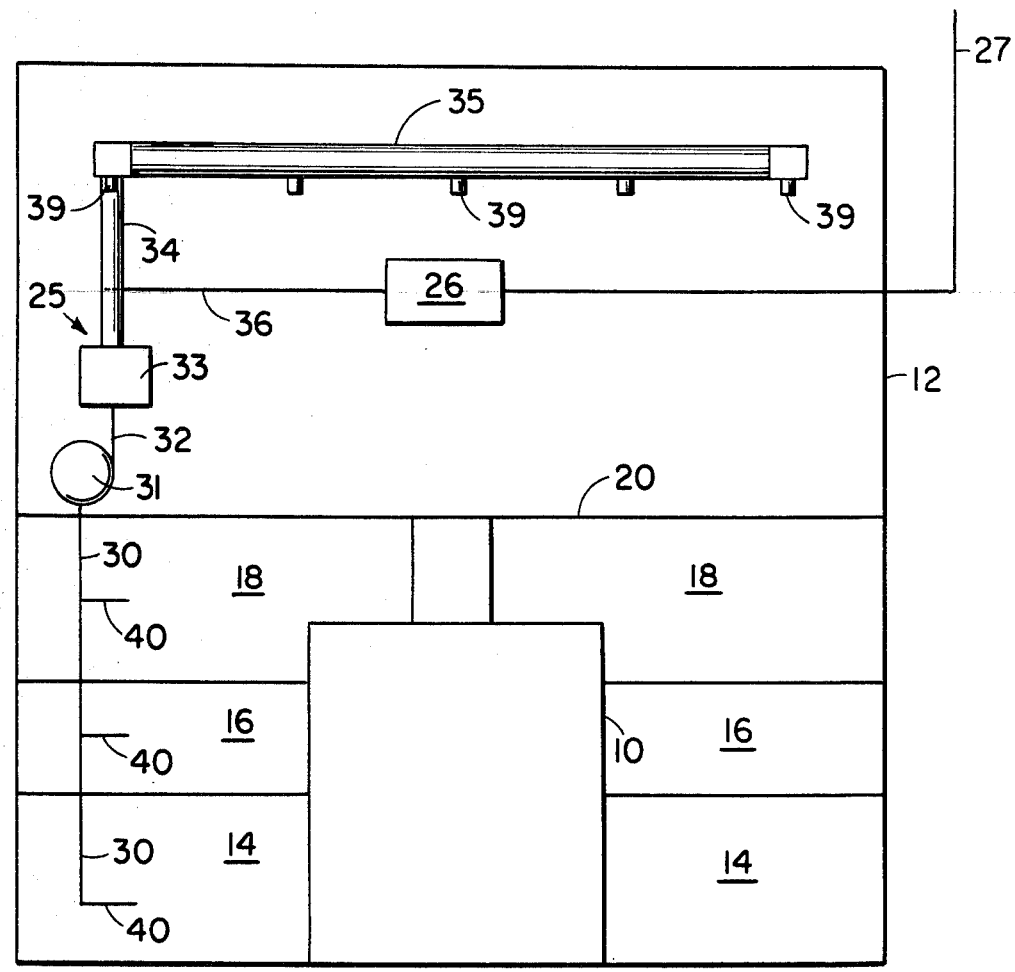
FIG. 1 is a schematic view partly in elevation, illustrating an emergency ventilating system constructed in accordance with a preferred embodiment of the invention, the view showing an air circulation system having a plurality of air intake openings located below the operating floor of a secondary containment building, an annular recirculation distribution duct located above the operating floor near the top of the secondary containment building, and an exhaust conduit discharging a small fraction of the recirculating air flow through conventional gas treatment equipment and, thence, to the outside atmosphere.

Referring now more particularly to the preferred embodiment of the invention shown in the accompanying drawings, there is schematically shown a conventional primary containment structure 10, enclosing the reactor vessel and associated auxiliary equipment (not shown), housed within a suitable, conventional secondary containment structure 12. Also schematically represented are a plurality of suitable zones 14, 16, and 18, and an operating floor 20, all of which are conventionally built into the containment structure between the primary and secondary containment vessels and conveniently house additional service and auxiliary equipment for the nuclear system (not shown).

In accordance with the invention, there is provided an emergency ventilating system, indicated generally by reference numeral 25, which limits the concentration of radioactivity in the air which is passed through conventional gas treatment equipment 26 and discharged to the outside atmosphere through vent 27.

As here preferably embodied, emergency ventilating system 25 comprises an intake duct 30 extending from the suction side of a suitable circulation fan 31, a first recirculation conduit 32 connecting the discharge of fan 31 with a mixing chamber 33, and a second recirculation conduit 34 connecting mixing chamber 33 with an annular, horizontally extending distribution duct 35. Duct 35 contains a plurality of openings 39 for distributing the circulating air flow to the containment volume. Each of openings 39 is preferably suitably designed so as to promote mixing of the circulating air flow passing therethrough with the containment air at the distribution point. An exhaust conduit 36 preferably receives a small fraction of the air flow discharged from fan 31 through conduit 34 which is passed through suitable gas treatment equipment 26 and exhausted to the outside atmosphere, more fully described hereinafter.

Advantageously, intake duct 30 extends to, and has one or more intake openings 40 at levels of the secondary containment building below the refueling, or operating, floor 20, and annular recirculating distribution duct 35 is located above operating floor 20, advantageously near the ceiling of the secondary containment building.

It will be seen from the foregoing that the emergency ventilation system of the present invention takes suction from one portion of the secondary containment and then discharges to another portion of the same containment. It will be understood to those skilled in the art that there are many possible suction and discharge arrangements equivalent to that illustrated in the drawings and that the object of these arrangements is to set up flow patterns within the secondary containment structure such that mixing of contaminated gases and vapors released into the secondary containment with the volume of air contained therein is ensured, or that this flow path between discharge and suction involves preferably at least a major portion of the free volume within the secondary containment building.

As previously mentioned, only a small fraction of the flow of air from the circulation fan 31 is exhausted through duct 36 and subsequently discharged to the atmosphere through vent 27. In accordance with the invention, this fraction is advantageously no more than about 5 percent. To this end, as preferably embodied, a large circulation of air is set up within the secondary containment structure by circulation fan 31, advantageously on the order of about 30,000 cubic feet per minute (cfm), and preferably only about 700 cfm of this air flow is discharged through exhaust duct 36 for subsequent discharge to the outside atmosphere.

Advantageously, the pressures within the system are balanced such that the exit flow through the gas treatment equipment will compensate for inleakage to the secondary containment building, and that the total building pressure will be between 0.25 and 0.5 in W.G. below atmospheric pressure.

In accordance with the emergency ventilating system of the invention, a representative concentration of gases and vapors contaminated with radioactivity and secondary containment air is at all times exhausted through duct 36 for subsequent discharge to the outside atmosphere.

Advantageously, this representative concentration of air is ensured by mixing thoroughly the fan discharge gases so that the composition is essentially constant throughout the gas mass at any given time. In this way, the desired proportion is simply withdrawn through exhaust duct 36, e.g., 700/30,000.

Figure 2:
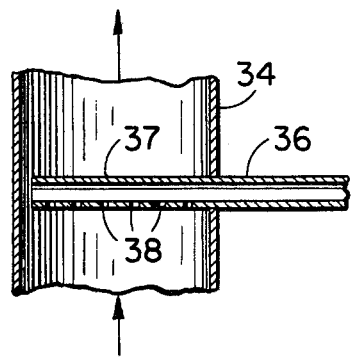
FIG. 2 is an enlarged, fragmentary view in elevation, partly sectional, illustrating the exhaust conduit extending into the recirculation conduit and containing a plurality of openings thereacross so as to pass into the exhaust conduit a gas stream having a concentration of radioactivity substantially equal to the average concentration of radioactivity contained in the recirculating air flow.

Additionally, as best seen in FIG. 2, and as here preferably embodied, exhaust duct 36 may be fed from a number of points in a cross-sectional plane extending substantially normally through the fan discharge conduit 34, i.e., by a "sampling tube" device 37, each point 38 passing an equal share of the recirculation air flowing through the conduit 34 to the exhaust duct 36.

It will be understood from the foregoing that even if it is assumed that contaminated gases and vapors leaking or accidentally released into the secondary containment structure are immediately passed into one of the intake duct openings 40, the provision of mixing chamber 33 and the use of a take-off device 37 akin to "sampling tube" probe take-off to the exhaust duct 36 ensures that only a small fraction of the activity, equal to 700/30,000, or approximately 2 percent, can possibly be immediately removed through the gas treatment equipment 26 and subsequently discharged to the outside atmosphere through vent 27. The remainder of the activity is discharged through the plurality of openings 39 from the annular recirculation distribution duct 35 at the top of the secondary containment building and mixes with the overall volume of air contained in the building.

The following exemplary calculations demonstrate that whether contaminated gases and vapors are immediately picked up by the emergency ventilating system of the present invention, or are delayed for a considerable length of time before being picked up by the system and ventilated to the outside atmosphere, has little effect on the overall operation of the system. The basis for each of the following examples is: (1) recirculation gas flow through fan 31 at 30,000 cfm; (2) discharge gas flow through exhaust conduit 36 to gas treating equipment 26 at 700 cfm; and (3) a containment volume of 2,000,000 ft$^3$.

EXAMPLE I

Assuming 20 units of radioactivity is instantaneously released to the secondary containment, the amount of radioactivity discharged on the first pass of gas through the emergency ventilating system is calculated as follows:

$$(20)(700)/30,000 = 0.47 \text{ units.}$$

The concentration of the remaining radioactivity, assuming a uniform mixture with the containment air, then equals $(20-0.47)/2,000,000$, or, $9.76 \times 10^{-6}$ units per cubic foot.

The amount of radioactivity corresponding to the passage of 700 cfm of gas having a radioactive concentration of $9.76 \times 10^{-6}$ units per cubic foot discharged to the gas treatment equipment for 2 hours is calculated as follows:

$$(700)(60)(2)(9.76 \times 10^{-6}) = 0.82 \text{ units.}$$

Thus, the total radioactivity discharged over the 2-hour period is:

$$0.47 + 0.82 = 1.29 \text{ units,}$$

which is 6.5 percent of the original 20 units which would have been discharged without the use of the emergency ventilating system of the invention.

EXAMPLE II

Assuming radioactivity is continuously released to the secondary containment at the rate of 10 units per hour, with a negligible initial concentration in the containment, the amount of radioactivity discharged on the first pass through the emergency ventilating system of the invention for a 2-hour period is calculated as follows:

$$(10)(2)(700)/(30,000) = 0.47 \text{ units.}$$

The average concentration of the remaining radioactivity over the first two hours is calculated as follows:

$$[(10)(2) - 0.47]/(2)(2,000,000) = 4.88 \times 10^{-6} \text{ units/ft}^3.$$

The amount of radioactivity corresponding to 700 cfm of gas having a radioactive concentration of $4.88 \times 10^{-6}$ units per cubic foot discharged to the gas treatment equipment for 2 hours is calculated as follows:

$$700(60)(2)(4.88 \times 10^{-6}) = 0.41 \text{ units.}$$

Thus, the total radioactivity discharged over the 2-hour period is:

$$0.47 + 0.41 = 0.88 \text{ units,}$$

which is 4.4 percent of the original 20 units that would have been discharged without the use of the emergency ventilating system of the invention.

The continuous discharge calculations in these examples neglect the use of the precise exponential concentration build-up and dilution equations but are a close approximation over a short (2-hour) time. These calculations also neglect radioactive decay during the two hour period.

It will be seen from the foregoing exemplary calculations that the emergency ventilating system of the invention results in a significant reduction in the amount of radioactivity discharged to the environment during the period of time immediately or closely following the discharge or accidental release of radioactivity into the containment. It will be understood that the delay of the contaminated gases and vapors in the containment structure prior to their discharge to the environment will further reduce their radioactivity through decay. The effect of radioactivity decay was not considered in the examples due to the complexity of the calculations.

It will be recognized that ultimately all activity remaining in the containment, which has not decayed, will be released to the environment where it will mix with the atmospheric air passing the release point. However, it will also be seen that, with the emergency ventilating system of the invention, this release takes place over a much longer period of time than is the case with previously known ventilating systems, thereby ensuring that the radioactivity released to the environment is mixed with a far greater volume of atmospheric air than was previously possible. The result of this increased dilution is to further significantly reduce the radioactivity level at any point surrounding the nuclear plant.

The invention in its broader aspects is not limited to the specific embodiment herein shown and described but departures may be made therefrom without departing from the principles of the invention and without sacrificing its chief advantages.

What is claimed is:

1. An emergency ventilating system in a nuclear power reactor containment vessel or the like controlling the release therein of gases and vapors contaminated with radioactivity, comprising:
    a circulating fan member having a suction side and a discharge side;
    intake duct means connected to said suction side of said circulating fan;
    recirculating duct means connected to said discharge side of said circulating fan;
    said recirculating duct means terminating in a recirculation distribution duct;
    air mixing means located within said recirculating duct means; and
    exhaust conduit means connected to said recirculating duct means at a point intermediate said air mixing means and said recirculation distribution duct,
    said exhaust conduit means terminating in vent means adapted to vent air exhausted therethrough to the environment surrounding said containment vessel.

2. An emergency ventilating system as claimed in claim 1, wherein said exhaust conduit means includes gas treatment means for removing a portion of said radioactivity contained in the air passing therethrough.

3. An emergency ventilating system as claimed in claim 1, wherein
    said intake duct means includes a plurality of spaced intake openings therein;
    said distribution duct includes a plurality of spaced distribution openings therein; and
    said intake and distribution openings are spaced from one another so as to develop a flow path therebetween which encompasses at least a major portion of the free volume within said containment vessel.

4. An emergency ventilating system as claimed in claim 1, wherein said exhaust conduit means is adapted to exhaust from said recirculating conduit means a small fraction of the recirculating air flowing therethrough.

5. An emergency ventilating system as claimed in claim 1, wherein said exhaust conduit means includes a terminal portion extending within and substantially completely across said recirculating conduit means, said terminal portion having a plurality of apertures spaced therealong, each of said apertures adapted to receive a substantially equal proportion of the recirculating air which flows past said aperture.

6. An emergency ventilating system as claimed in claim 1, wherein said system maintains said containment vessel at subatmospheric pressure.

7. An emergency ventilating system as claimed in claim 3, wherein
said emergency ventilating system is located within a secondary containment structure having an operating floor and a plurality of service levels beneath said operating floor;
said plurality of intake duct openings are located at at least one of said levels of said secondary containment structure below said operating floor; and
said plurality of distribution openings are located above said operating floor.

8. An emergency ventilating system as claimed in claim 4, wherein said fraction of recirculating air flowing through said recirculating conduit means which is exhausted through said exhaust conduit means is less than about 5 percent.

9. An emergency ventilating system as claimed in claim 6, wherein said distribution duct is located near the top of said secondary containment structure.

10. A method for ventilating a nuclear power reactor containment vessel or the like upon the release therein of gases and vapors contaminated with radioactivity, comprising the steps of:
developing a recirculating air flow path within said containment vessel;
mixing said gases and vapors contaminated with radioactivity with said recirculating air flow path; and
continuously exhausting a small fraction of the mixed, recirculating air flow to the environment surrounding said containment vessel, whereby the maximum rate of radioactivity release to said environment is limited to the ratio of exhaust flow to recirculation flow.

11. The method as claimed in claim 10, wherein said recirculating air flow path encompasses at least a major portion of the free volume within said containment vessel, so that radioactivity which has not been discharged becomes substantially uniformly mixed within said major portion of the containment volume.

12. The method as claimed in claim 10, wherein said exhausted fraction of said mixed, recirculating air flow is received from a plurality of spaced points within a plane substantially normal to said recirculating air flow.

13. The method as claimed in claim 10, wherein said fraction of said recirculating air flow which is exhausted is less than about 5 percent.

14. The method as claimed in claim 10, including the step of maintaining said containment vessel at sub-atmospheric pressure.

15. The method as claimed in claim 10, including the step of: passing said exhausted fraction of said mixed, recirculating air flow through gas treatment means for the removal of a portion of said radioactivity therefrom prior to exhausting said fraction to the environment surrounding the containment vessel.

16. The method as claimed in claim 10, wherein said containment vessel comprises a secondary containment structure having an operating floor and a plurality of service levels beneath said operating floor, and wherein air is removed from at least one of said levels below said operating floor and is discharged above said operating floor near the top of said secondary containment structure.

* * * * *